United States Patent [19]

Holland

[11] 4,245,544
[45] Jan. 20, 1981

[54] MOUTHPIECE PRACTICE HOLDER AND TUNING ADJUSTER

[76] Inventor: Jack O. Holland, 3314 West End Ave., Nashville, Tenn. 37203

[21] Appl. No.: 67,033

[22] Filed: Aug. 16, 1979

[51] Int. Cl.³ .............................................. G09B 15/06
[52] U.S. Cl. .................................. 84/465; 84/387 R; 84/398; 84/394
[58] Field of Search ..................... 84/387 R, 388, 398, 84/399, 453, 465

[56] References Cited

U.S. PATENT DOCUMENTS

| 2,118,684 | 5/1938 | Prescott | 84/465 |
| 3,447,415 | 6/1969 | Kime | 84/465 |
| 3,451,302 | 6/1969 | Lamart | 84/465 |
| 3,474,698 | 10/1969 | Anbo | 84/399 |
| 3,659,489 | 5/1972 | Vale | 84/465 |
| 3,808,935 | 5/1974 | Reeves | 84/399 |
| 3,853,034 | 12/1974 | Vale | 84/465 |

*Primary Examiner*—Lawrence R. Franklin
*Attorney, Agent, or Firm*—Rogers, Eilers & Howell

[57] ABSTRACT

A mouthpiece practice holder has a base which approximates the envelope of that portion of a brass instrument normally held by the left hand and supports a mouthpiece from a brass instrument for practice playing or buzzing. A mouthpiece rod is adjustably supported from the base by a guide and tightener assembly and a mouthpiece receiver attached to the end of the mouthpiece rod has a taper to slidably receive and retain the mouthpiece. Practice valves may be provided in the base so that the right hand may "finger" the note being played or buzzed as the left hand holds the base. A rimpiece holder supports only a rim from a mouthpiece and may be inserted into the mouthpiece receiver as a substitute for the mouthpiece to permit closer observation of the lips, etc. in relation to the mouthpiece rim as the rim is "buzzed". The guide and tightener assembly may be slightly modified and used to control the tuning of an instrument which is tuned from the mouthpipe or bell. A smooth controlled tuning action is provided by a threaded adjustment nut mounted on a threaded sleeve so that the instrument may be quickly and accurately tuned by moving a telescoping pipe member in or out.

12 Claims, 7 Drawing Figures

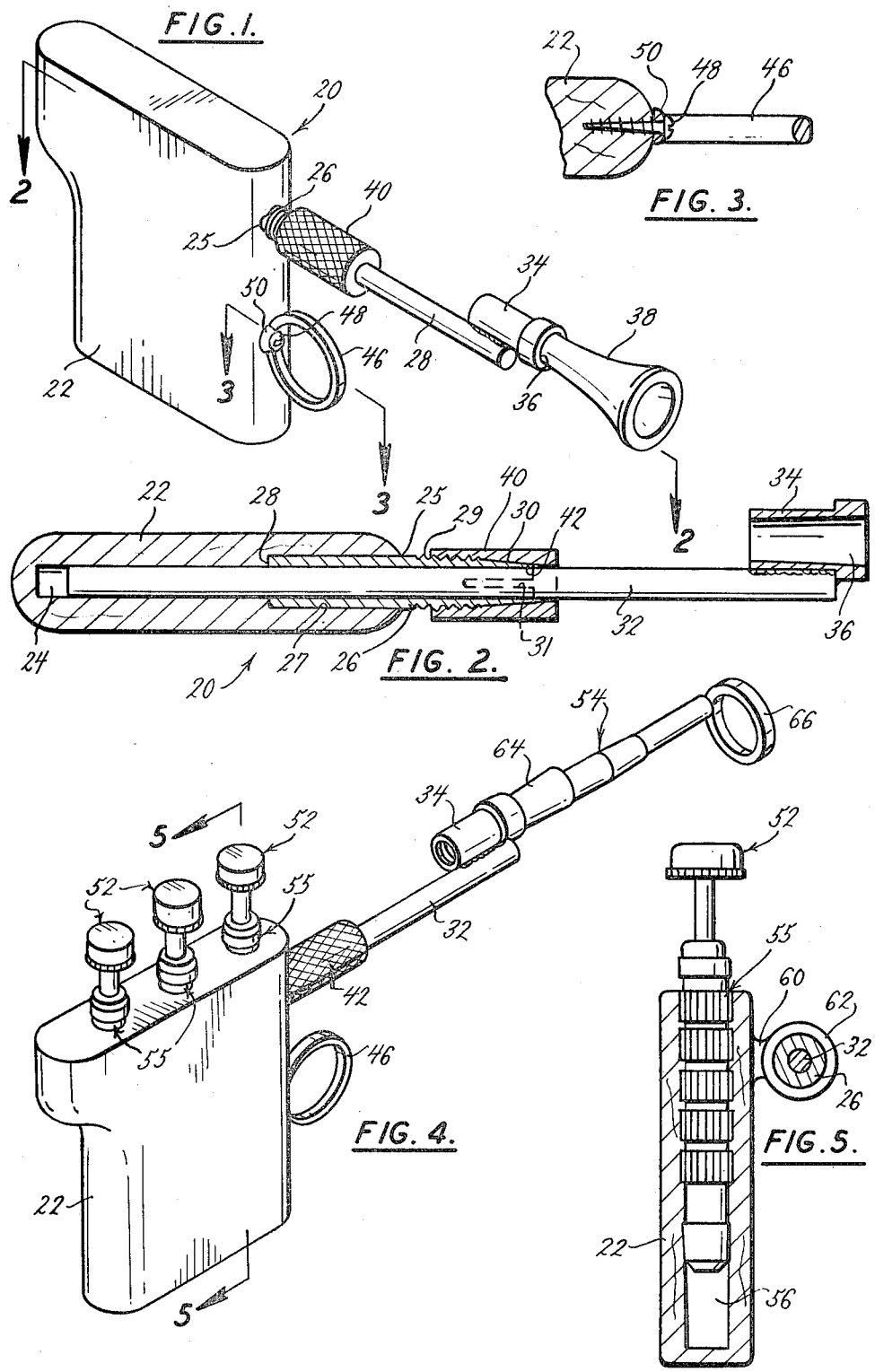

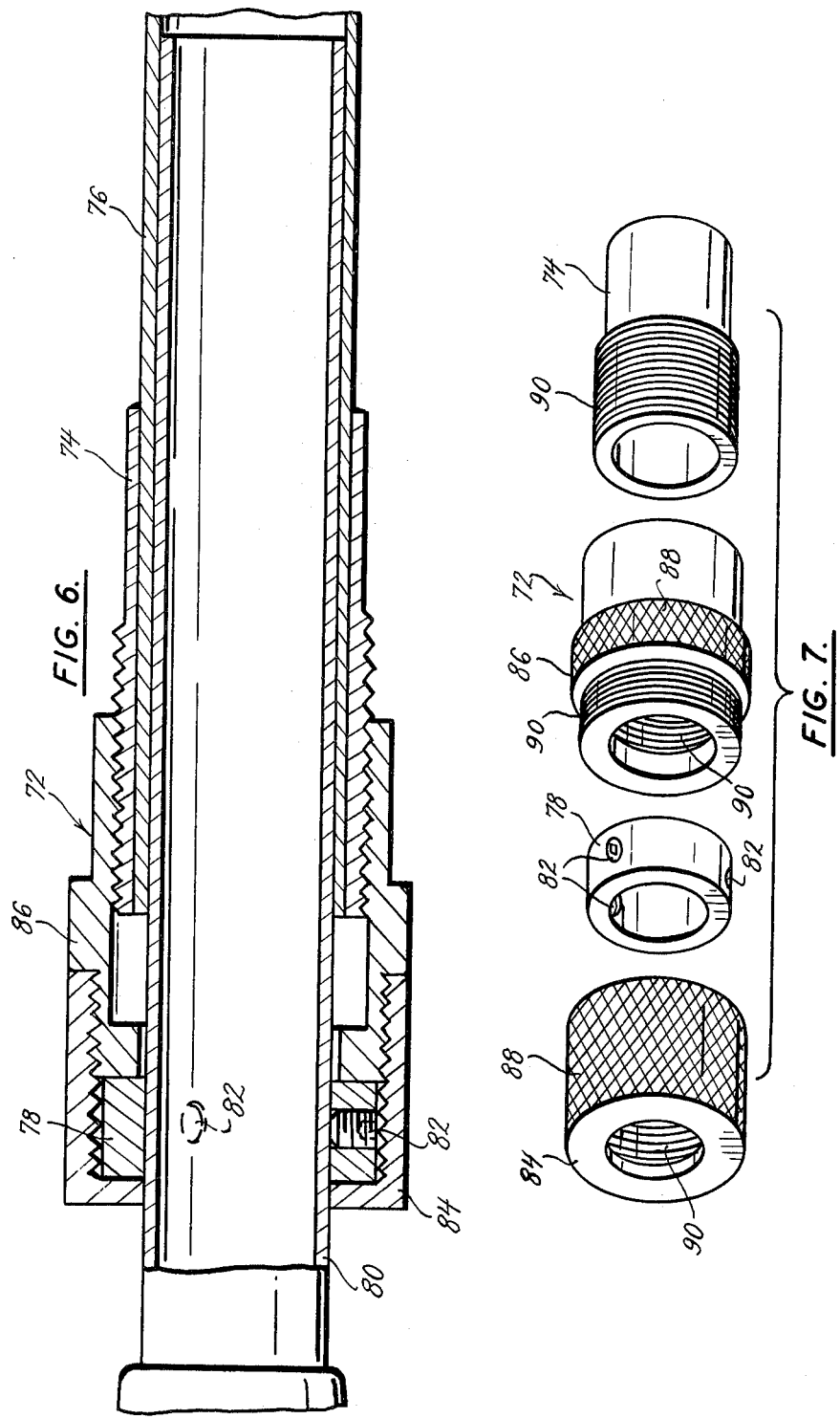

MOUTHPIECE PRACTICE HOLDER AND TUNING ADJUSTER

BACKGROUND AND SUMMARY

Mouthpiece buzzing, or playing on just the mouthpiece of a brass instrument, is widely practiced by many outstanding players and is advocated by many leading teachers of brass instruments. It permits the player to concentrate on the proper technique of buzzing without the distraction of hearing the instrument itself. Various facets of buzzing may be practiced including achieving proper intonation, manipulating the mouthpiece with the lips, e.g. downward on the lips for high notes and upward on the lips for low notes, ensuring the proper embouchure, and maintaining correct body posture with respect to the mouthpiece.

Traditionally, the mouthpiece is buzzed by simply holding it between the index finger and thumb of the left hand and placing it directly up against the mouth. However, as is apparent to one who has both played a brass instrument and practiced mouthpiece buzzing, there is a considerable difference in the physical feel of the mouthpiece when the instrument is not used to support it. This difference in feel may contribute to the development of habits during buzzing which do not aid and even detract from the proper technique for playing the instrument. For example, when holding the mouthpiece in the fingers, there is a tendency for the player to over-manipulate the mouthpiece on the lips to achieve the proper intonation. When the player returns to the instrument, he is disappointed to find that this extra manipulation is not possible. A mirror is often used to check the position of the mouthpiece but the hand partially obstructs the view of parts of the player's body, including the neck, chin, etc. These and other differences make traditional mouthpiece buzzing not as helpful as it could be in learning proper playing technique.

Applicant has developed a mouthpiece practice holder which provides virtually the identical hold, feel and action of the left hand, and thus the mouthpiece, as in the actual playing of the instrument. In playing, the left hand supports the instrument, controls the pressure of the mouthpiece against the lips, operates rings and triggers on valve slides, and accomplishes the tilting or pivoting of the mouthpiece on the lips through movement of the left wrist. Generally, the right hand is used to operate the valves and does not have a substantial effect on the player's embouchure. Applicant's mouthpiece practice holder includes a base which may be made of wood or the like and is designed to provide substantially the same envelope or feel for the left hand as if the player was holding the instrument itself. A mouthpiece rod extends outwardly from the base and supports a receiver to hold the mouthpiece. Both the mouthpiece rod and receiver may be made of stainless steel or the like. The mouthpiece rod is of sufficient size and shape to orient the left hand in substantially the same position as during play of the instrument. Thus, with applicant's holder, the left hand and the mouthpiece are in substantially the same orientation for buzzing as when the instrument is played which greatly increases the benefits from mouthpiece buzzing. This eliminates the tendency to develop the bad habit of over-manipulation, permits the development of proper embouchure and posture, contributes to the proper pivoting technique for low and high notes, and does not affect the intonation of the mouthpiece.

Modifications may be made to applicant's main embodiment to further enhance the benefits from practice playing. For example, spring loaded push rods, or the like, which serve as practice valves, may be provided to enable the player to "finger" the note he is buzzing through the mouthpiece. This gives the player something to do with his right hand and also makes possible the "playing over" of difficult passages to smooth out the valve fingering in cooperation with the proper lip technique. As any horn player knows, typically there are only a few troublesome passages which require the bulk of a player's concentration and practice time before an entire musical piece can be mastered. With the practice valves added to applicant's mouthpiece practice holder, the most important elements of playing these passages, embouchure, valve fingering, and mouthpiece buzzing and intonation may be worked on under almost exactly the same conditions as with the horn.

Another feature of applicant's invention includes a rimpiece holder which slides into the receiver and supports a rim only of a mouthpiece through which the lips may be observed as they buzz. Although the use of mouthpiece rims supported by a handle are known from the prior art, these devices do not begin to simulate the brass instrument and the relative positioning of the hands, the pressure of the leader pipe against the mouthpiece rim, etc. as is experienced in the actual playing of the instrument. With applicant's rimpiece holder, the rim may be held against the mouth, and the lips observed under almost the exactly same conditions of pressure, hand location, resistance to manipulation and positioning as is actually experienced during the playing of the instrument. Thus, a player's embouchure may be observed, corrected, and practiced under the proper conditions to ensure its proper development.

Included in applicant's mouthpiece holder is a guide and tightener which is used to adjustably position a mouthpiece rod a variable distance from a base. Applicant's guide and tightener may be slightly modified and used separately as a replacement for the conventional clamping device used in flugelhorns and the like to tune the instrument. In a typical flugelhorn, tuning is achieved by loosening a thumbscrew type clamp which fixedly positions a movable pipe section in the leader pipe or in the tuning bell area. The problem with the prior art tuning device is that the thumbscrew type clamp does not allow accurate repositioning to adjust the tune of the instrument as the pipe must be loosened from its fixed position, retightened in position and the instrument played to determine its new pitch. Thus, it is necessary to move the pipe to a guessed at "in tune" position, tighten the thumbscrew clamp, and then play the key note to determine the instrument's tune. Very often, the first guess is incorrect and subsequent guesses must be made to bring the instrument closer into tune. Each time, the thumbscrew clamp must be loosened and the mouthpiece nudged into a new position. As is evident, this is a rather clumsy procedure to achieve tuning of an instrument and is not nearly as desirable as the infinitely adjustable slide crooks generally provided on trumpets and other brass instruments.

Applicant's modified guide and tightener may be used to provide the infinitely variable and controlled tuning action of an adjustable slide crook in a flugelhorn and any other instrument using the conventional thumbscrew clamp. A double threaded adjustment nut mounts the mouthpiece to the leader pipe so that the mouthpipe may be moved in or out merely by turning the adjustment nut. The pitch or tune of the instrument changes as the mouthpipe is moved into or out of the leader pipe and much greater control over this movement is possible as the adjustment nut ensures positive positioning and even movement not heretofore possible with the prior art device. The instrument may even be played as the tuning is adjusted and the tuning may be finely changed to bring the instrument exactly into tune.

These and other advantages of applicant's invention may be more fully appreciated by referring to the drawings and the description of the preferred embodiment.

BRIEF DESCRIPTION OF THE DRAWINGS

FIG. 1 is a perspective view of applicant's mouthpiece practice holder;

FIG. 2 is a cross-sectional vieew taken along the plane of line 2—2 in FIG. 1 further detailing the mouthpiece rod, guide and tightener;

FIG. 3 is a cross-sectional view taken along the plane of line 3—3 in FIG. 1 detailing the mounting of the thumb ring;

FIG. 4 is a perspective view of applicant's mouthpiece practice holder with practice valves mounted in the base;

FIG. 5 is a cross-sectional view taken along the plane of line 5—5 in FIG. 4 and further detailing the practice valve and mouthpiece rod mounting;

FIG. 6 is a cross-sectional view of applicant's tuning adjuster as mounted on a mouthpiece and leader tube; and FIG. 7 is an exploded view of the individual parts of applicant's tuning adjuster.

DETAILED DESCRIPTION OF THE PREFERRED EMBODIMENT

For applicant's preferred embodiment, a trumpet or cornet has been chosen; however a mouthpiece practice holder emulating any brass instrument may be similarly constructed and applicant's invention and teaching includes that for any such instrument.

A first embodiment of applicant's mouthpiece practice holder 20 is shown in FIGS. 1, 2 and 3 and includes a base 22 which has an aperture 24 extending horizontally through its length with an opening 25. Base 22 is shaped to approximate the envelope of that portion of a preselected brass instrument grasped by the left hand as it is played. A guide 26 is mounted in counterbore 27 of base 22 and has a central opening 28 of about the same diameter and aligned with aperture 24. A portion of guide 26 extends rearwardly out of counterbore 27 and has threads 29 along part of its outer circumference. The guide 26 has a tapered end 30 extending rearwardly from threads 29 with two slots 31 formed therein. A mouthpiece rod 32 is sized to slide through tapered end 30, guide 26, and into aperture 24. A receiver 34 is secured to the end of mouthpiece rod 32 and has a tapered opening 36 to match the taper much as that of a standard leader tube (not shown) in a typical brass instrument. A standard mouthpiece 38 from a brass instrument may thus be inserted into receiver 34 and the tapered bit retains it in position as in a standard brass instrument, as is known in the art. Tapered opening 36 is sized so that a standard mouthpiece 38 will extend all the way through the receiver so that its effective or resonant length is not altered. This ensures that the intonation of the buzzing during practice is the same as during playing of the instrument. A tightener 40 has a tapered central cavity 42 which matches the tapered end 30 of guide 26. Threads 44 on tightener 40 match and line up with threads 29 on guide 26 so that as tightener 40 is threaded onto guide 26, tapered cavity 42 engages tapered section 30 to compress slots 31 about mouthpiece rod 32 and fix it in position. The position of the mouthpiece 38 with respect to base 22 may thus be adjusted by moving mouthpiece rod 32 into or out of aperture 24 and also by rotating mouthpiece rod 32 so that receiver 34 revolves to a different position. As shown in FIG. 3, a thumb ring 46 is secured to base 22 wih a screw 48 or the like and a swivel 50 is provided so that thumb ring 46 may be rotated into any desirable position.

A second embodiment of applicant's mouthpiece practice holder is shown in FIGS. 4 and 5 and includes optional features which are not shown in applicant's first embodiment. These include practice valves 52 and a rimpiece holder 54. Three practice valves 52 are shown mounted vertically in base 22 to closely simulate the valves of a brass instrument such as a trumpet or cornet. As shown in FIG. 5, the practice valves 52 include spring loaded plunger assemblies 55 which may be friction fit into the base 22. Sufficient space 56 is provided beneath each valve 52 to accommodate the extension of the spring loaded plunger as the valve cap 58 is depressed. In this embodiment, guide 26 is externally mounted to the outside of base 22 by a plurality of supports 60 and an extension tube 62 may be provided to receive the mouthpiece rod 32 as does aperture 24 in the first embodiment.

The rimpiece holder 54 may be used in place of mouthpiece 38 as it permits the unobstructed viewing of the position of the player's mouth with respect to the mouthpiece rim. Rimpiece holder 54 includes a tapered section 64 which fits within receiver 34 and is retained thereby as with a standard mouthpiece 38. A mouthpiece rim 66 is secured to the end of rimpiece holder 54 by a threaded stud and hole (not shown) or the like, and provides a substitute for the entire mouthpiece 38, as is known in the art.

A modified guide 26 and tightener 40 may be installed on a flugelhorn or the like and provide for adjustable tuning in place of the conventional thumbscrew clamp. As shown in FIGS. 6 and 7, applicant's tuning adjuster 72 includes sleeve 74 which is soldered to a leader tube 76 of a flugelhorn or the like, collar 78 which is fastened to a mouthpiece 80 with set screws 82 or the like, and fastener 84 which slides around mouthpipe 80 and collar 78 to secure them to adjustment nut 86. Knurlings 88 are provided along the outer edges of fastener 84 and adjustment nut 86 and the various pieces have matching threads 90, as is shown in the drawings. In operation, mouthpipe 80 may be moved in and out of leader tube 76 by rotation of fastener 84, and adjustment nut 86 so that collar 78, fastener 84, and mouthpipe 80 are moved as adjustment nut 86 traverses the threads 90 on sleeve 74. The threads 90 between adjustment nut 86 and sleeve 74 may be staked, as is known in the art, to limit the range of tuning available and prevent overtightening and damage to the components.

Changes and modifications to applicant's invention would be apparent to one of ordinary skill in the art in view of the disclosure and teaching herein. However, these are included as part of applicant's invention which is limited only by the scope of the claims appended hereto.

What is claimed is:

1. A mouthpiece practice holder to simulate a brass instrument and support its mouthpiece to permit practice playing by buzzing the mouthpiece comprising a base having an envelope approximating that portion of the instrument normally grasped by the left hand, and means to mount a mouthpiece in substantially the same orientation to said base as said mouthpiece would occupy with respect to that portion of the instrument normally grasped by the left hand.

2. The device of claim 1 further comprising a ring rotatably attached to the base and positionable to receive the thumb of the left hand.

3. The device of claim 1 wherein the mounting means includes a receiver having a taper and diameter sufficient to receive and retain the mouthpiece without altering its resonant length.

4. The device of claim 3 further comprising a rimpiece holder having a tapered support member for insertion into the receiver and a rim secured to the opposite end of said rimpiece holder, said rimpiece holder and rim substituting for a mouthpiece.

5. The device of claim 3 further comprising a rimpiece holder including a tapered section to fit into and be retained by the receiver, and a rim secured to the other end of said rimpiece holder.

6. The device of claim 3 further comprising a removable and adjustable mouthpiece rod extending between the base and the receiver.

7. The device of claim 6 wherein the base has means defining an aperture to slidably receive the mouthpiece rod.

8. The device of claim 6 further comprising a guide secured to the base and aligned with said aperture to receive the mouthpiece rod therethrough, said guide having threads around its circumference and at least one slot in its rearward end, and a tightener having threads matching said guide threads with a tapered neck so that as said tightener is screwed onto said guide, the tapered neck is drawn over the slotted end and compresses it against the mouthpiece rod to secure it.

9. The device of claim 8 further comprising a ring rotatably attached to the base and positionable to receive the thumb of the left hand.

10. The device of claim 9 wherein the brass instrument is a trumpet or cornet and the base approximates the envelope of three valves of the trumpet or cornet.

11. The device of claim 10 further comprising three spring loaded plungers vertically mounted in the base to simulate the valves of a trumpet or coronet.

12. The device of claim 10 wherein the base is made of wood and the rest of said mouthpiece practice holder is made of stainless steel.

* * * * *